(12) United States Patent
Xie et al.

(10) Patent No.: US 9,828,300 B2
(45) Date of Patent: Nov. 28, 2017

(54) HIGH-ENERGY COMPOSITE PEPTIDE SELENOPROTEIN NUTRIENT SOLUTION, PREPARATION METHOD AND APPLICATION THEREOF

(71) Applicant: Chao Xie, Beijing (CN)

(72) Inventors: Chao Xie, Beijing (CN); Jianjiu Cui, Beijing (CN); Huadiao Fu, Beijing (CN)

(*) Notice: Subject to any disclaimer, the term of this patent is extended or adjusted under 35 U.S.C. 154(b) by 223 days.

(21) Appl. No.: 14/770,813

(22) PCT Filed: Dec. 26, 2013

(86) PCT No.: PCT/CN2013/090593
§ 371 (c)(1),
(2) Date: Aug. 26, 2015

(87) PCT Pub. No.: WO2014/131309
PCT Pub. Date: Sep. 4, 2014

(65) Prior Publication Data
US 2016/0009604 A1 Jan. 14, 2016

(30) Foreign Application Priority Data
Feb. 27, 2013 (CN) .......................... 2013 1 0060994

(51) Int. Cl.
C05D 9/02 (2006.01)
C05F 11/10 (2006.01)
C05D 5/00 (2006.01)

(52) U.S. Cl.
CPC ............... *C05D 9/02* (2013.01); *C05D 5/00* (2013.01); *C05F 11/10* (2013.01); *Y02E 50/343* (2013.01); *Y02W 30/47* (2015.05)

(58) Field of Classification Search
None
See application file for complete search history.

(56) References Cited

U.S. PATENT DOCUMENTS 6,458,179 B1 * 10/2002 Puskarich ................ C05D 3/02
47/DIG. 10

FOREIGN PATENT DOCUMENTS

| CN | 1412158 A | 4/2003 |
|---|---|---|
| CN | 101462904 A | 6/2009 |
| CN | 101817710 A | 9/2010 |
| CN | 102617247 A | 8/2012 |
| CN | 102701844 A | 10/2012 |
| CN | 103120107 A | 5/2013 |
| CN | 103120110 A | 5/2013 |
| CN | 103145495 A | 6/2013 |

* cited by examiner

*Primary Examiner* — Wayne Langel
(74) *Attorney, Agent, or Firm* — Maschoff Brennan

(57) ABSTRACT

High-energy composite peptide selenoprotein nutrient solutions, preparation methods and applications thereof enable crops to access selenoprotein nutrients. The nutrient solution includes selenium-containing materials, proteins, minerals, vitamins and natural energy ores, etc. Through protein enzymatic treatment, synthesis of peptide selenoprotein complex, energy treatment, complexation reaction and fortification, etc., the high-energy composite peptide selenoprotein nutrient solution is prepared, and can be widely used in the development of various kinds of selenium-rich agricultural products (including various kinds of grain crops, vegetables, fruits, fungi, wild plants, sea foods, animal meats, herbs, etc.). The mother liquor of high-energy composite peptide selenoprotein nutrient solution is diluted with water by 6000 to 8000 times; in the different growing period of crops, irrigate and spray the nutrient solution to the roots and foliages of crops, generally spraying 3-6 times, to get the selenium-rich agricultural products that can meet the standards.

20 Claims, No Drawings

HIGH-ENERGY COMPOSITE PEPTIDE SELENOPROTEIN NUTRIENT SOLUTION, PREPARATION METHOD AND APPLICATION THEREOF

TECHNICAL FIELD

The present invention relates to a crop selenium-rich solution, in particular, to a high-energy composite peptide selenoprotein nutrient solution, specifically a high-energy composite peptide selenoprotein nutrient solution containing peptide selenoprotein, rich minerals, vitamins and natural energy minerals, etc.

BACKGROUND ART

Selenium deficiency is closely related to people's health. In 1973, the World Health Organization announced to the world, the trace element selenium is an important and indispensable element in human's life activities. In 1988, the trace element selenium was listed in one of the fifteen essential dietary nutrients that are taken up every day by Chinese Nutrition Society.

China is poor in selenium. According to measurement of relevant department, selenium is lack in 72% lands, and seriously lack in 29% lands. Seventy percent of populations (as high as one billion, covering 22 provinces) need to supplement selenium. The deficiency in selenium may directly lead to decreased immunity according to analysis of scientists. The clinical medical evidences also show that selenium deficiency is associated with over 40 kinds of diseases that threaten to human health and life, such as cancers, cardiovascular diseases, liver diseases, cataracts, pancreatic diseases, diabetes, Keshan disease, reproductive system diseases and so on.

The main functions of selenium are as follows: (1) anti-oxidation, anti-aging, "the first element to keep people young"; (2) to enhance immunity and prevent diseases. Selenium is called as "the king for anti-cancer" by the World Health Organization; (3) to detoxify and disperse blood stasis. Selenium can promote the tissues and organs to eliminate the heavy metals, pesticide residues and excessive blood sugar, blood fat and cholesterol from the body, and purify the circulatory system; (4) radiation protection; (5) to improve the quality of agricultural products, enhance the activity of plant cells, and more and adequate nutrition; (6) to resist pests and diseases. Selenium can partially replace pesticides, to reduce amount of pesticides and pesticide residues. Therefore, selenium plays an irreplaceable role in the health of human and plants.

Yu Ruomu, a famous nutritionist in china, said that "selenium deficiency in human body is associated with the health of millions of people. We shall do a good job of selenium supplement like iodine supplement, especially the selenium supplement in the elderly. At present, it is imperative to do two things:

First, it is necessary to publicize the knowledge of selenium related to human health to the residents, to enhance their awareness on how to prevent selenium deficiency.

Second, strengthen the development and production of selenium-rich products, and promote the selenium-rich products.

At present, the selenium can be supplemented through the following three channels:

(1) Inorganic selenium: Sodium selenite-based, difficult to absorb, easy to be poisoned, unsafe. It should be used to patients under the guidance of physicians, which should not be popularized extensively. In some countries, it is prohibited to add inorganic selenium in foods by legislation.

(2) High-selenium health-care product: It is easy to carry and convenient to take, but expensive.

(3) Selenium-rich agricultural products: selenium is supplemented through normal diets. Besides, it is organic, nutritional selenium, with comprehensive nutrition. It is safe, reliable, affordable, and suitable for the masses. It is the main channels to supplement selenium for human.

The selenium content in the existing grain, vegetables, fruits and other natural foods is low; therefore, it is necessary to develop the selenium-rich foods, to relieve the situation of selenium deficiency, which is the most effective channel to promote human health, and an important guarantee for enhancing the overall quality of Chinese nation and building a well-off society.

At present, a variety of selenium-rich plant growth regulators are available on the markets, but there are still some drawbacks. Over the past two decades, the present inventor(s) have focused on relevant studies and applications and made continuous improvements and innovations from the first generation of inorganic selenium agents, to the second generation of selenium complex agents, the third generation of selenoprotein agents and until the fourth generation of peptide selenoprotein agents. Their effects are described as follows:

The first generation of selenium-rich agents, mainly the inorganic selenium agents, could enhance the selenium content in the crops and Chinese herbal medicines. The second generation of selenium-rich agents, mainly the selenium complex agents, could enhance the selenium content in the crops and Chinese herbal medicines, and improve the quality of crop and Chinese herbal medicine products; the third generation of selenium-rich agents, mainly the selenoprotein agents, could enhance the selenium content in the crops and Chinese herbal medicines, and improve the quality of crops and Chinese herbal medicines, with good taste, and it can enhance the antiseptic ability with a long shelf life. The fourth generation of selenium-rich agents, mainly the peptide selenoprotein agents, could enhance the organic selenium content and the output of fruits and vegetables, crops, herbs, and improve resistance to pests and diseases, reduce the use of pesticides, and improve the antiseptic ability with a long shelf life.

SUMMARY OF THE INVENTION

The present invention provides a high-energy composite peptide selenoprotein nutrient solution, also known as the fifth generation of selenium-rich agent, which is developed on the basis of the previous products. It can greatly increase the selenium contents, nutritional values, and improve the pest and disease resistance and antiseptic ability of crops.

The high-energy composite peptide selenoprotein nutrient solution is composed of selenium-containing material, hydrolysate of protein, natural mineral, acetic acid, EDTA, penetrating agent, mineral additives, vitamin supplements, organic silicone, soluble modified starch, emulsifier, and small-molecular active water according to the following ratios (in weight): (1) selenium-containing material, 1-3%, (2) natural mineral, 0.5‰, (3) protein material, 2-3%, (4) acetic acid, 1~5‰, (5) EDTA, 0.5~1‰, (6) penetrating agent, 1‰, (7) trace element additive 6-10‰, (8) vitamin supplements, 0.2-0.3‰, (9) organic silicone 1‰, (10) soluble starch, 1%, (11) emulsifier, 1.5%-5%, (12) small-molecular active water, 87-93%.

The said selenium-containing material is one or more from the element selenium (SE), selenium oxide, sodium selenite, selenium salt, and organic selenium.

The said natural mineral is one or more from medical stone, nano-scale magnetic powder, tourmaline, volcanic rock or volcanic ash.

The said emulsifier is monostearin: glycerin monostearate (short as GMS), sodium stearyl lactate (ssl), calcium stearyl lactate (csl), diacetyl tartaric acid esters of mono- and diglycerides (datem), sugar esters (se) or distilled monoglycerides (dmg).

The said penetrating agent is methanol or ethylene glycol.

The said proteins are animal or plant proteins, microbial proteins or peptide compounds.

The compositions of said trace element additives are as follows: zinc 1-3‰; magnesium 1-2‰; manganese 1-2.5‰; molybdenum 0.1-0.15‰; boron 2-3‰.

The compositions of said vitamin supplements are as follows: VC: 0.1‰; VB1 and VD: 0.1.-0.2‰.

The method for preparing the aforesaid high-energy composite peptide selenoprotein nutrient solution, comprising the following steps:

1) Protein enzymolysis: Protein enzymolysis and peptide treatment of protein materials, to get the purified protein digest, which is the amino-protein peptide;
2) Synthesis of peptide selenoprotein compound: add the organic silicone protective agent in the resulting substance in step 1), add selenium material, and evenly mix them for 1.5 h at 55° C.;
3) Energy treatment: mix natural mineral raw materials, the trace element additives, acetic acid, soluble modified starch together, and evenly stir them for 1 h at 42~70° C.;
4) Complexation reaction: Add EDTA to the resulting mixture in step 2) to react 2.5 h at 50~85° C.;
5) Fortification treatment: Add penetrating agent, vitamin supplements to the resulting mixture in step 3), and mix them 1 h under room temperature;
6) Emulsification pretreatment: put emulsifier in container, heat it to melt into liquid; add small-molecular active water at proximately 70° C. with weight 4-5 times of the emulsifier to the high-speed mixer, start the mixer to violently stir the hot water. Slowly add the melted emulsifier to the hot water for mixing, to get a milky white pasty fluid, and then cool down to the room temperature for standby;
7) Emulsification treatment: mix the substances obtained in step 4), step 5) and step 6), and add appropriate amount of small-molecular active water, stir them for 1 h at room temperature;
8) Prepare the qualified high-energy composite peptide selenoprotein nutrient mother liquor for storage after passing inspection and sterilization.

The said protein enzymolysis adopts neutral protease, with the substrate concentration 3%, neutral protease concentration 4.5%, phosphate buffer solution at PH 7, temperature 50° C. The enzymolysis procedure lasts 1-2 hours, and the undigested proteins are centrifuged and separated, to get the purified protein digest, namely the amino protein peptide.

The said application of high-energy composite peptide selenoprotein nutrient solution is as follows: to spray the diluted high-energy composite peptide selenoprotein nutrient solution to the water, earth or plant leaves of crops during the growth process, to make crops rich in selenium.

The said crops are agricultural products or medicinal and edible herbs.

The said agricultural products are grains, vegetables, fruits, dried fruits or flowers.

In the present invention, the protein is digested to amino protein peptide, which reacts with selenium to synthesize peptide selenoprotein complex under the protection of organic silicone protective agent, and further enhances the product energy through the energy accelerant-natural energy mineral. Through adding vitamins, mineral supplements to make crops absorb more comprehensive nutrition. The penetrating agent and small-molecular active water can promote the absorption of various active ingredients more rapidly and effectively. The high-energy composite peptide selenoprotein nutrient solution can greatly increase the selenium contents, nutritional values, and improve the pest and disease resistance and antiseptic ability of crops.

The proteins, vitamins, minerals and energy accelerants added in the nutrient solution formulations can dramatically enhance the contents of essential mineral elements such as zinc, magnesium, manganese, molybdenum, boron and vitamins B, C, D in the crops, improve the smoothness and delicateness of selenium-rich fruits and vegetables with best taste, increase the antioxidant and bacteria resistance, to make selenium-rich agricultural products easy storage and transport.

The selenium and boron and other elements in the nutrient solution formulations can be converted to plant nutrients, and resist bacteria and pests. It also shows significant effect for nematodes, leek maggot and fruit rot disease and other serious diseases and pests, and can partially substitute the pesticides, to reduce the consumption of pesticides and the pesticide residues, and achieve the green standards for the selenium-rich agricultural products.

In the present invention, after sand filtration, carbon filtration and membrane filtration and the nano-tech electric ion exchange equipment, the harmful acidic substances in the ordinary drinking water can be separated, to retain the mineral ions in water, to get the small-molecular active water. It is featured by alkalescence and small molecular clusters. The small molecular water can facilitate the dissolution of above components and fast absorption by the crops, enhance the absorption rate of nutrition solution, to achieve comprehensive and balanced nutrition.

The high-energy composite peptide selenoprotein nutrient solution in the present invention can be directly applied to the soil in the roots after diluted as required, or can be sprayed to the plants or leaf after diluted with water. In the acid soil (PH 4.5-6.5), since absorption of selenium and sulfur exhibits antagonism and selenium is not easily absorbed and utilized by the crops, spraying method is applied. In alkaline soils (PH 7.5-8.5), selenium is easily absorbed and utnizlaited by the crops, so both methods can be adopted. In the crop plantation process, it is recommended to use organic fertilizers, biological-based pesticides, and prohibited to use highly toxic pesticides with high residues, prohibited to irrigate with contaminated water, and restricted to use the use growth regulators, so that the selenium-rich crops can achieve the green standards.

The large area of cultivation test in recent year showed that, after absorption, transmission and conversion of high-energy composite peptide selenoprotein in the invention, most of selenium can be gathered at the plant's roots, leaves and fruits in the form of organic form, and appropriate amount of selenium enters into the plant cells, which enhances the content of glutathione peroxidase, strengthen the in vivo antioxidant capacity of plants, improve the plant's resistance and anti-aging ability, to enhance the yields and nutrition of the crops. The grains can be of full seeds, the vegetables can be of original flavor and melons and fruits are large and sweet. The fruits will not change color after cutting and the fruit flesh will not be perishable. Therefore, the selenium-rich products developed by the nutrient solution are praised "delicious and good-looking, nutrition and healthcare, less disease and high yield".

The high-energy composite peptide selenoprotein nutrient solution in the present invention has the following advantages: after applying the solution in the plants, especially in crops and vegetables, the crops accelerate the absorption and enrichment of selenoprotein, which promote the in vivo absorption of various kinds of nutrients that can facilitate the growth and improvement of tastes. The tests have shown that, the selenium content in the fruits, vegetables, grain crops after applying the nutrient solution is in full compliance with *Tolerance limit of selenium in foods* (GB13105-91): ≤0.05 mg/kg for fruits, 10-100 microgram/kg for fresh vegetables, 100-300 microgram/kg for grains, oils and their products, and 250-500 micrograms/kg for eggs.

The selenium-rich nutrient solution in the present invention can not only provide selenium for crops, but also provide a variety of trace elements and energy accelerants needed for the crop normal growth, promote the crop growth and disease resistance, and resistance to harmful substances, and improve crop quality and yield.

After the spray tests of the nutrient solution in Shandong Yiyuan apple base, Yinan vegetables, grapes, mulberry base, Henan wheat base, Shanxi wheat, lotus base, the selenium content can meet the national standard. The yield per mu is increased by around 5-10%, and the economic income can be increased by RMB 1,000 yuan per mu. After spraying in melons and fruits, the economic incomes per mu are far more than 2-5 times of that in grain crops.

Since the use of high-energy composite peptide selenoprotein nutrient solution is to produce selenium-rich rather than high-selenium agricultural products, it is necessary to implement the standardized management during the production and processing. The nutrient solution spraying frequency and concentration should vary for different crops.

The high-energy composite peptide selenoprotein nutrient solution in the present invention, different from previous selenium-rich agents, has advanced technology, greatly improves the stable and reliable selenium-enrich effect, the safety and nutritional values of selenium-rich foods, specifically as follows:

1. Improving the content of organic selenium in products safely;
2. Improving the quality of fruits and vegetables, farming, herbs, etc.;
3. Improving the taste of fruits and vegetables, and the fruits are sweet and crisp;
4. Enhancing the resistance to pests and diseases, and reducing the use of pesticides;
5. Enhancing the antiseptic ability, with a long shelf life;
6. Increasing the contents of glutathione, SOD, and enhancing the antioxidant capacity;
7. Enhancing the content of rubber flavonoids and smoke detoxification ability;
8. Enhancing human's resistance to virus and infections;
9. Improving body's ability against electromagnetic radiation;
10. Greatly enhancing the absorption and utilization of nutrients, and the healthcare effect by the energy treatment process.

DETAILED DESCRIPTIONS OF THE PREFERRED EMBODIMENTS

The invention is described herein in connection with certain specific embodiments.

The fifth generation of selenium agent-high-energy composite peptide selenoprotein nutrient solution is composed of selenium-containing material, hydrolysate of protein, natural mineral, acetic acid, EDTA, penetrating agent, mineral additives, vitamin supplements, organic silicone, soluble modified starch, emulsifier, and small-molecular active water according to the following ratios (in weight): (1) selenium-containing material, 1-3%, (2) natural mineral, 0.5‰, (3) protein material, 2-3%, (4) acetic acid, 1~5‰, (5) EDTA, 0.5~1‰, (6) penetrating agent, 1%, (7) trace element additives 6-10‰, (8) vitamin supplements, 0.2-0.3‰, (9) organic silicone 1‰, (10) soluble starch, 1%, (11) emulsifier, 1.5%-5%, (12) small-molecular active water, 87-93%.

The selenium-rich agricultural products developed by the nutrient solution of the present invention can be classified into three categories:

The first category: Appropriate amount of nutrient solution is introduced to the plants timely, after the selenium element is absorbed by the plant, it will be converted to selenoprotein in vivo to form the agricultural products with selenium-rich leaves, stems and seeds.

The second category: The eggs and meat products produced with the feeds of the selenium-rich agricultural products converted in the first category.

The third category: the selenium-rich products deeply-processed by the above two categories of selenium-rich agricultural products.

The following embodiments merely serve to illustrate the invention, but the scope of the present invention is not limited to the following embodiments which shall include the following products developed with the nutrient solution in the invention: grains, vegetables, fruits, dried fruits, fishes, crustaceans (shrimp, crab, etc.), meat and eggs, flowers, medicinal and edible items announced by the Ministry of Health. The technicians of ordinary skill in the art can achieve the purposes in the invention according to the disclosed contents herein.

Embodiment 1

Ingredients: (1) selenium-containing material 2 KG, (2) natural mineral 0.05 KG, (3) protein material 2 KG, (4) acetate 0.3 KG, (5) EDTA 0.1 KG, (6) penetrating agent 0.1 KG, (7) trace element additives, zinc: 0.1 KG; magnesium: 0.1 KG; manganese: 0.2 KG; molybdenum: 0.01 KG; boron: 0.21 KG, (8) vitamin supplements, VC: 0.01 KG; VB1 and VD: 0.02 KG in total; (9) silicone 0.1 KG, (10) soluble starch 1 KG, (11) emulsifier 3 KG, (12) small molecule active water, around 90.7 KG, total 100 KG. The high-energy composite peptide selenoprotein nutrient solution is prepared according to the above method.

Embodiment 2

The Application of High-Energy Composite Peptide Selenoprotein Nutrient Solution in Apples Planting and Growing The high-energy composite peptide selenoprotein nutrient solution prepared in above embodiment 1 is a highly concentrated product. Prior to use, the nutrient solution is diluted by 100-fold to prepare the stock solution, which then diluted by 60 to 80-fold to prepare the nutrient solution that can be directly sprayed. The spray amount per mu each time is 30~40 kg diluted nutrient solution. Usually the nutrient solution is sprayed 5 times during the whole growing period of apples and the yield per mu is about 3,000 kg. In recent years, the inventor(s) has developed several hundred mu selenium-rich apple demonstration bases in Zibo Yiyuan, Yinan, Linqu, Shandong province. Before the germination of apple trees, the diluted nutrient solution is uniformly sprayed to the branches and trunks of apple trees mechanically or manually. In the fruit setting period, spray the nutrient solution to the branches and trunks and surfaces of leaves once again. Spraying is prohibited in the dew, rainy days and at noon in hot days, otherwise, the direct absorption of selenium on the leaf surface will be affected. In the beginning of May, mid-July middle fruit phase, and 20 days before fruit harvest, spray the nutrient solution to the surfaces of leaves three times, respectively.

After tested by Shandong Province Test Center (GB5009.93-2010), the selenium content of delivered samples is 20.6 microgrammes/kg, conforming to the limit specified in the national standard.

The selenium content in fruits should be ≤0.05 mg/kg in accordance with *Tolerance limit of selenium in foods* (GB13105-91). Therefore, the selenium content in selenium-rich apples shall also meet this standard. The amount of high-energy composite peptide selenoprotein nutrient solution should be controlled. After 5-6 times of spraying selenium nutrient solution to branches and trunks and surfaces of leaves, the selenium content of selenium-rich apples can be up to 20 to 50 micrograms per kg, but if spraying too many times excessively, the selenium content of apples will exceed the limit specified in the standard.

As the high-energy composite peptide selenoprotein nutrient solution contains rich proteins, amino acids, energy accelerants, a variety of trace elements and other elements that can promote the plant growth, it can enhance the yield of apples. Moreover, the selenium-rich apples taste good, crisp and delicious, rich in glutathione and SOD, with high oxidation resistance and easy to storage. More importantly, the clinical applications have showed that, after a long-term consumption of this kind of apples, it would not increase the blood glucose of patients with diabetes, but rehabilitated their pancreas islet and stabilize their blood glucose levels, so it is the safe selenium-rich fruits for patients with diabetes. For patients with liver diseases (including hepatitis B), after a long-term consumption, their liver functions increased, and resistance to infection also enhanced. Dozens of cases of cancer patients improved their physical fitness, prolonged life and reduced pains after a long term of consumption of the selenium-rich apples.

In the selenium-rich apple bases located in Zhongzhuang, Yiyuan, Shandong, by using the high-energy composite peptide selenoprotein nutrient solution, the apples produced are free of pesticides, fertilizer residue, and they have such unique features of good colors, thin peels, juicy and crisp fruit fleshes, contain unique, efficient selenium compounds, which prove to be selenium-rich foods with high activity. The base successfully established a safe, effective channel for human to supplement selenium through diets.

Embodiment 3

Fortified Cultivation of Selenium-Rich Rice Using the Nutrient Solution Prepared in Embodiment ①

In the present invention, the nutrient fortified selenium-rich rice that is rich in selenium and other trace elements is cultivated in Shandong Tancheng through the following methods:

1. Preparation of foliage spray nutrient solution: The high-energy composite peptide selenoprotein nutrient solution in the present invention is diluted to 100-fold using small-molecular active water, to prepare the stock solution; take appropriate amount of stock solution, and dilute it by 60 to 80-fold with the active water, about 30~50 kg diluted high-energy composite peptide selenoprotein nutrient solution for each mu of rice field.

2. First time of spraying in the rice seedlings stage. Spray the high-energy composite peptide selenoprotein nutrient solution to the seedling foliage at a consumption of 10~20 kg/100 $m^2$;

3. Second time of spraying in the heading to flowering stage. Spray the nutrient solution to the foliages of rice, 30-50 kg per mu. The spraying should be carried out in weak light days or in the afternoons, or early evenings.

4. In the grain filling stage, that is, 5-7 days after the second time of spraying, spray the nutrient solution for the third time; and harvest 15-20 days later.

After the above steps, the rice seedlings are harvested and processed to make the finished products. After tested in Shandong Province Test Center (GB5009.93-2010), the selenium content of delivered samples is 189 microgrammes/kg, conforming to the limit (100-300 microgrammes/kg) for grains and oil products specified in the *Tolerance limit of selenium in foods* (GB13105-91).

What is claimed is:

1. A high-energy composite peptide selenoprotein nutrient solution, comprising:
   selenium-containing material, natural mineral, hydrolysate of protein, acetic acid, EDTA, penetrating agent, trace element additives, vitamin supplements, organic silicone, soluble modified starch, emulsifier, and water solution according to the following ratios (in weight):
   (1) selenium-containing material, 1-3%,
   (2) natural mineral, 0.5‰,
   (3) hydrolysate of protein, 2-3%,
   (4) acetic acid, 1-5‰,
   (5) EDTA, 0.5-1‰,
   (6) penetrating agent, 1‰,
   (7) trace element additive, 6-10‰,
   (8) vitamin supplements, 0.2-0.3‰,
   (9) organic silicone 1‰,
   (10) soluble modified starch, 1%,
   (11) emulsifier, 1.5-5%, and
   (12) water, 87-93%.

2. The high-energy composite peptide selenoprotein nutrient solution according to claim 1, wherein the selenium-containing material comprises one or more selected from the group consisting of:
   the element selenium (SE),
   selenium oxide,
   sodium selenite,
   selenium salt, and
   organic selenium.

3. The high-energy composite peptide selenoprotein nutrient solution according to claim 1, wherein the natural mineral comprises one or more selected from the group consisting of:
   medical stone,
   nano-scale magnetic powder,
   tourmaline,
   volcanic rock, and
   volcanic ash.

4. The high-energy composite peptide selenoprotein nutrient solution according to claim 1, wherein the emulsifier comprises one or more selected from the group consisting of:

glycerin monostearate (GMS),
sodium stearyl lactate (ssl),
calcium stearyl lactate (csl),
diacetyl tartaric acid esters of mono- and diglycerides (datem),
sugar esters (se), and
distilled monoglycerides (dmg).

5. The high-energy composite peptide selenoprotein nutrient solution according to claim 1, wherein the penetrating agent comprises methanol or ethylene glycol.

6. The high-energy composite peptide selenoprotein nutrient solution according to claim 1, wherein said proteins comprises animal or plant proteins, microbial proteins or peptide compounds.

7. The high-energy composite peptide selenoprotein nutrient solution according to claim 1, wherein the compositions of said trace element additives by weight ratio with respect to the solution include the following:
zinc 1-3‰;
magnesium 1-2‰;
manganese 1-2.5‰;
molybdenum 0.1-0.15‰; and
boron 2-3‰.

8. The high-energy composite peptide selenoprotein nutrient solution according to claim 1, wherein the compositions of said vitamin supplements by weight ratio with respect to the solution include the following:
vitamin C: 0.1‰;
vitamin B1, and
vitamin D: 0.1-0.2‰.

9. A method of applying the high-energy composite peptide selenoprotein nutrient solution according to claim 1, comprising:
spraying diluted high-energy composite peptide selenoprotein nutrient solution to water, earth or plant leaves of crops during the growth process, to make the crops rich in selenium.

10. The method according to claim 9, wherein the crops are agricultural products or medicinal or edible herbs.

11. The method according to claim 10, wherein the agricultural products are grains, vegetables, fruits, dried fruits or flowers.

12. A method for preparing a high-energy composite peptide selenoprotein nutrient solution, the high-energy composite peptide selenoprotein nutrient solution comprising:
the following ratios (in weight):
(1) selenium-containing material, 1-3%,
(2) natural mineral, 0.5‰,
(3) hydrolysate of protein, 2-3%,
(4) acetic acid, 1-5‰,
(5) EDTA, 0.5-1‰,
(6) penetrating agent, 1‰,
(7) trace element additive, 6-10‰,
(8) vitamin supplements, 0.2-0.3‰,
(9) organic silicone 1‰,
(10) soluble modified starch, 1%,
(11) emulsifier, 1.5%-5%, and
(12) water, 87-93%;
the method comprising the following acts:
1) performing protein enzymolysis and peptide treatment of protein materials, to obtain purified protein digest, which is an amino protein peptide;
2) synthesis of peptide selenoprotein compound by adding the organic silicone in the resulting substance of act 1), adding the selenium containing material, and evenly mixing them for approximately 1.5 h at approximately 55° C.;
3) performing energy treatment by mixing natural mineral raw materials, the trace element additives, the acetic acid, and the soluble modified starch together, and evenly mixing them for approximately 1 h at 42~70° C.;
4) performing a complexation reaction by adding the EDTA to the resulting mixture of act 2) to react for approximately 2.5 h at 50-85° C.;
5) performing fortification treatment by adding the penetrating agent and the vitamin supplements to the resulting mixture of act 3), and mixing them for approximately 1 h under substantially room temperature;
6) performing emulsification pretreatment by:
placing the emulsifier in a container and heating to melt into liquid;
adding the water at approximately 70° C. with weight 4-5 times of the emulsifier to a mixer;
start the mixer to begin stirring the water;
adding the melted emulsifier to the water for mixing, to obtain milky white pasty fluid; and
cooling down to the room temperature for standby;
7) performing emulsification treatment by mixing the substances obtained in act 4), act 5) and act 6), and adding appropriate amount of water, and mixing for approximately 1 h at substantially room temperature, so as to prepare said high-energy composite peptide selenoprotein nutrient solution.

13. The preparation method according to claim 12, wherein the protein enzymolysis adopts neutral protease, with the substrate concentration at approximately 3%, neutral protease concentration at approximately 4.5%, phosphate buffer solution at approximately pH 7.0, and at a temperature of approximately 50° C., the protein enzymolysis lasting 1-2 hours, and the undigested proteins being centrifuged and separated, to obtain the amino protein peptide.

14. The method according to claim 12, wherein the selenium-containing material comprises one or more selected from the group consisting of:
the element selenium (SE),
selenium oxide,
sodium selenite,
selenium salt, and
organic selenium.

15. The method according to claim 12, wherein natural mineral comprises one or more selected from the group consisting of:
medical stone,
nano-scale magnetic powder,
tourmaline,
volcanic rock, and
volcanic ash.

16. The method according to claim 12, wherein the emulsifier comprises one or more selected from the group consisting of:
glycerin monostearate (GMS),
sodium stearyl lactate (ssl),
calcium stearyl lactate (csl),
diacetyl tartaric acid esters of mono- and diglycerides (datem),
sugar esters (se), and
distilled monoglycerides (dmg).

17. The method according to claim 12, wherein the penetrating agent comprises methanol or ethylene glycol.

18. The method according to claim 12, wherein said proteins comprise animal or plant proteins, microbial proteins or peptide compounds.

19. The method according to claim 12, wherein the compositions of said trace element additives by weight ratio with respect to the solution include the following:
zinc 1-3‰;
magnesium 1-2‰;
manganese 1-2.5‰;
molybdenum 0.1-0.15‰; and
boron 2-3‰.

20. The method according to claim 12, wherein the compositions of said vitamin supplements by weight ratio with respect to the solution include the following:
vitamin C: 0.1‰;
vitamin B1, and
vitamin D: 0.1-0.2‰.

\* \* \* \* \*